Aug. 4, 1925.
F. W. JOHNSON
1,548,366
OIL LEVEL INDICATOR
Filed Dec. 17, 1921
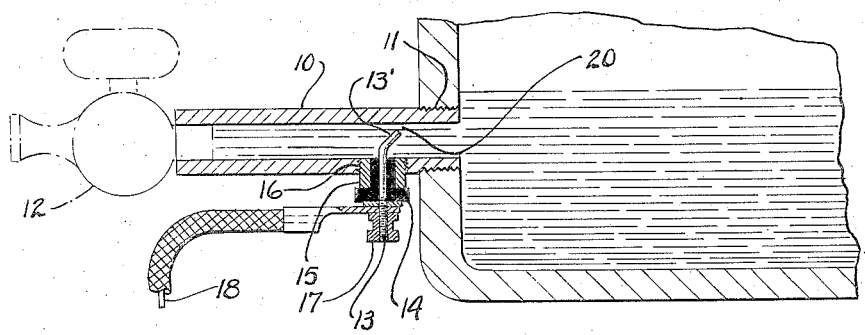
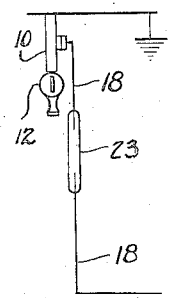
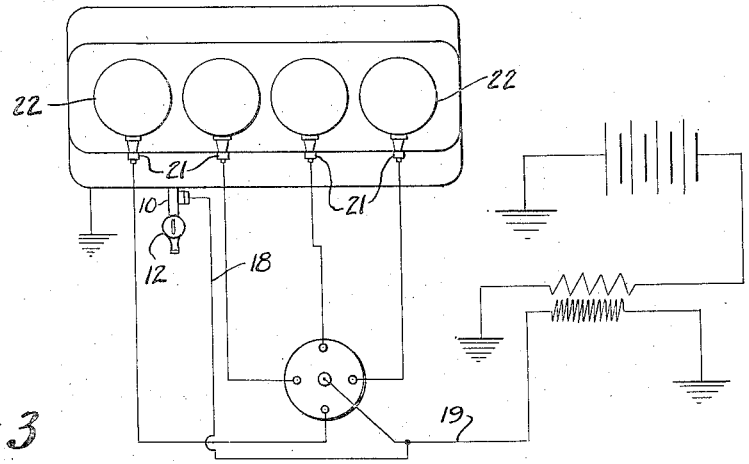
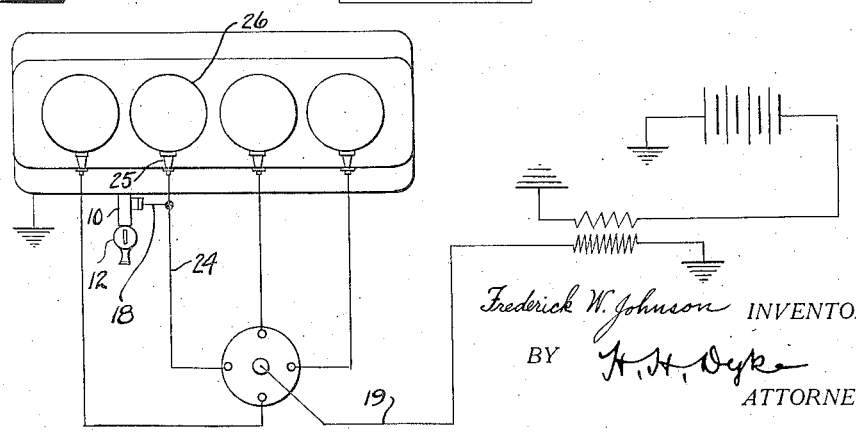
Frederick W. Johnson INVENTOR
BY H. H. Dyke
ATTORNEY Patented Aug. 4, 1925.

1,548,366

UNITED STATES PATENT OFFICE.

FREDERICK W. JOHNSON, OF OSSINING, NEW YORK, ASSIGNOR OF ONE-HALF TO JAMES W. KNOBLOCK, OF NEW YORK, N. Y.

OIL-LEVEL INDICATOR.

Application filed December 17, 1921. Serial No. 523,141.

*To all whom it may concern:*

Be it known that I, FREDERICK W. JOHNSON, a citizen of the United States, and a resident of Ossining, county of Westchester, and State of New York, have invented a new and useful Improvement in Oil-Level Indicators, of which the following is a specification.

My invention relates to oil level indicators which may be made use of wherever an indication is desired of oil falling below a given level, and the same will be herein described in connection with an internal combustion engine and for affording indication of the level of oil in the engine base.

According to my invention a pair of separated high tension electrical terminals are provided, which are normally immersed in the oil at the level desired to be indicated. As long as the oil level is maintained at such a height that the terminals are immersed in the oil the current is prevented from passing by the insulating effect of the oil, but when the oil level is lowered so that the terminals have only an air gap between them the current passes and thereby affords an indication that the oil is low and should be replenished.

Various modes of utilizing the passage of high tension current may be resorted to. For example, the ignition current for the engine may be shorted in whole or in part, so that the engine is stopped or a cylinder or cylinders caused to miss, or the current passing through the air gap may be utilized to operate a signal, as by sounding a horn or energizing a Geissler tube or the like.

In the drawings forming a part of this specification; Fig. 1 is a cross-sectional view of terminals normally immersed in the oil of an internal combustion engine base. Fig. 2 is a diagrammatical view showing how the ignition current of the engine may be completely short circuited. Fig. 3 is a view similar to Fig. 2, but showing the wiring for the shorting of a single cylinder, and Fig. 4 is a diagrammatical view of a method of displaying a visual signal.

A simple mode of constructing the separated terminals is shown in Fig. 1, in which a short section of tubing 10 of conducting material is screwed into the petcock hole 11 of the engine base, the petcock 12 being moved to the other end of the pipe, so that it may be used to test the oil level as is customarily done. A terminal 13 is passed into the pipe 10, preferably through the side thereof, and is insulated as by the insulating sleeve 14, the latter passing through a plug 15, which is threaded into the opening 16 in the side wall of the tubing 10. The outer end of the terminal 13 is threaded to receive a binding nut 17 to secure in place one end of the lead wire 18. The side of the pipe 10 may be used as the remaining terminal of the pair, and adjustment of the length of gap can readily be made, as by bending the end 13' of the terminal 13. It will be seen that the construction described affords a device which is simple and readily made up, and that the parts can easily be assembled in the desired relation and adjusted before the pipe 10 is screwed into place.

Various other forms of construction may, of course, be resorted to for providing the terminals, if desired, that shown being intended only for the purpose of illustration and for affording an understanding of the invention. For example, the pipe 10 to which the terminal 13 is applied may be an oil line above the level of the oil pump, thus providing a positive check on the operation of the pump. When wire 18 is connected to the high tension feed wire 19 of the engine ignition circuit there is normally no interference with the ordinary operation of the engine, since the current is kept from passing the gap 20 between the terminal 13 and the pipe 10 by the presence of the insulating oil therein, but when the oil level falls exposing the terminals, leaving merely an air gap, the current chooses this path instead of the path through the spark plugs 21 and through the highly compressed gases in the cylinders 22, thus cutting off the ignition current and stopping the engine. A Geissler tube 23 may be interposed in the lead 18 so that the tube will glow by the passage of the current therethrough when the gap 20 is created. This is shown in Fig. 4. Such a Geissler tube may be mounted on the dash board and thus constitute an ever present means to signal the operator when the oil level drops, without interfering with the operation of the engine.

If desired, the engine need not be completely stopped but ignition may be cut off in one or more of the cylinders only. This is particularly desirable if the terminal 13 is applied to an oil line above the pump. In Fig. 3 I have shown the lead wire 18 connected to the wire 24 leading to the spark plug 25 of cylinder 26, and with this arrangement when the oil level falls the engine is not completely stopped, but the ignition of the single cylinder 26 is cut off, thereby affording a sufficiently understandable indication of the fact that the oil level is so low as to expose the gap 20 in the engine base, and that the oil supply should be replenished.

The device has been found to operate satisfactorily even when the oil in the engine base contains sediment or extraneous matter, but frequent renewal of the oil in the engine base is recommended in order to prevent any interposition of conducting material within the gap 20. If the oil in the base becomes diluted as by gasoline getting into the base or loses its lubricating qualities from other causes, the insulating properties of the oil are likewise reduced and current can pass. Thus the device may afford an indication that the oil should be drawn off and replaced with fresh oil, even though the oil is not so low as to leave an air gap between the terminals.

It will be understood that changes and modifications may be resorted to within the scope of my claims without departing from the spirit of my invention.

I claim:

1. The combination in an internal combustion engine comprising an oil circulation lubricating system and a high tension ignition circuit, of a shunt for said ignition circuit having a gap therein normally immersed in the oil of the lubricating system and kept insulated thereby and adapted to be automatically shorted or jumped when the oil loses its insulating properties or falls below the gap level.

2. Apparatus in accordance with claim 1, in which the shunt includes means for indicating current passage therethrough.

3. Apparatus in accordance with claim 1, in which the shunt includes light producing means for indicating current passage therethrough.

In testimony whereof, I have signed my name hereto.

FREDERICK W. JOHNSON.